(12) United States Patent
Yleva

(10) Patent No.: US 9,186,952 B2
(45) Date of Patent: Nov. 17, 2015

(54) SUSPENSION ASSEMBLY HAVING A SWAY BAR

(71) Applicant: BRP FINLAND OY, Rovaniemi (FI)

(72) Inventor: Hannu Yleva, Rovaniemi (FI)

(73) Assignee: BRP FINLAND OY, Rovaniemi (FI)

( * ) Notice: Subject to any disclaimer, the term of this patent is extended or adjusted under 35 U.S.C. 154(b) by 0 days.

(21) Appl. No.: 14/397,974

(22) PCT Filed: Apr. 29, 2013

(86) PCT No.: PCT/US2013/038654
§ 371 (c)(1),
(2) Date: Oct. 30, 2014

(87) PCT Pub. No.: WO2013/165901
PCT Pub. Date: Nov. 7, 2013

(65) Prior Publication Data
US 2015/0091269 A1  Apr. 2, 2015

Related U.S. Application Data

(60) Provisional application No. 61/640,267, filed on Apr. 30, 2012.

(51) Int. Cl.
*B60G 21/055* (2006.01)
*B60G 3/14* (2006.01)
*B62K 5/00* (2013.01)

(52) U.S. Cl.
CPC ............ *B60G 21/0551* (2013.01); *B60G 3/145* (2013.01); *B60G 21/055* (2013.01);
(Continued)

(58) Field of Classification Search
CPC ........... B60G 21/0551; B60G 21/0553; B60G 21/0556; B60G 21/0558; B60G 21/055; B60G 2204/122; B60G 2204/1222; B60G 2204/1224; B60G 2204/1226; B60G 2300/124; B60G 2202/135; B60G 17/025; B60G 2206/427; B62K 2005/001; B62K 5/01

USPC .................... 280/124.152, 124.106
See application file for complete search history.

(56) References Cited

U.S. PATENT DOCUMENTS 3,448,994 A * 6/1969 King et al. ............. 280/124.106
6,056,304 A * 5/2000 Brambilla ............. 280/124.111
(Continued)

FOREIGN PATENT DOCUMENTS

CN 102363408 A 2/2012
EP 0876263 B1 12/1999
EP 2378018 A2 10/2011

OTHER PUBLICATIONS

International Search Report of International Application PCT/US2013/038654; Sep. 6, 2013; Blaine R. Copenheaver.
(Continued)

*Primary Examiner* — Keith Frisby
(74) *Attorney, Agent, or Firm* — BCF LLP

(57) ABSTRACT

A suspension assembly for a vehicle has left and right suspension arms, left and right shock absorbers operatively connected to their corresponding suspension arms, a sway bar operatively connected to the left and right suspension arms, left and right hinges pivotally connecting corresponding ends of the sway bar to their corresponding suspension arms. Each hinge includes a first hinge member pivotally connected to its corresponding end of the sway bar, a second hinge member pivotally connected to its corresponding suspension arm, the second hinge member being pivotally connected to the first hinge member, and a hinge lock selectively rigidly connecting the first hinge member to the second left member to prevent the first hinge member from pivoting relative to the second hinge member. A vehicle having the suspension assembly is also disclosed.

20 Claims, 10 Drawing Sheets

(52) U.S. Cl.
CPC ...... *B60G21/0556* (2013.01); *B60G 2200/132* (2013.01); *B60G 2202/135* (2013.01); *B60G 2204/1224* (2013.01); *B60G 2206/427* (2013.01); *B60G 2300/124* (2013.01); *B60G 2300/13* (2013.01); *B62K 2005/001* (2013.01)

(56) References Cited

U.S. PATENT DOCUMENTS

| | | | |
|---|---|---|---|
| 6,073,714 | A | 6/2000 | McHorse et al. |
| 6,799,781 | B2 | 10/2004 | Rasidescu et al. |
| 2003/0080526 | A1 | 5/2003 | Conover |
| 2005/0073126 | A1* | 4/2005 | Seki ................. 280/124.152 |
| 2008/0023240 | A1 | 1/2008 | Sunsdahl et al. |
| 2014/0131971 | A1 | 5/2014 | Hou |

OTHER PUBLICATIONS

English translation of EP0876263B1; retrieved from http://www.patbase.com/ on Jul. 31, 2013.

English translation of CN102363408A; retrieved from http://www.patbase.com/ on Jul. 31, 2013.

* cited by examiner

SUSPENSION ASSEMBLY HAVING A SWAY BAR

CROSS-REFERENCE

The present application claims priority to U.S. Provisional Patent Application No. 61/640,267, filed Apr. 30, 2012, the entirety of which is incorporated herein by reference.

FIELD OF THE INVENTION

The present invention relates to a suspension assembly having a sway bar and to a vehicle having such a suspension assembly.

BACKGROUND OF THE INVENTION

When a wheeled vehicle having a pair of spaced apart front wheels and/or a pair of spaced apart rear wheels turns, the frame and body of the vehicle have a tendency to roll toward the outside of the turn. In the example of a four-wheel vehicle, when the vehicle turns, the suspensions associated with the wheels on the outer side of the turn are compressed and the suspensions associated with the wheels on the inner side of the turn expand due to the weight transfer toward the outside of the turn. As a result, there is less weight on the wheels on the inside of the turn and therefore less traction provided by these wheels. The roll of the frame and body can also have an effect on the steering of the vehicle. The amount of roll/weight transfer increases as the vehicle speed increases and as the radius of curvature of the turn reduces.

In order to address the above inconveniences, some vehicles are provided with a sway bar. The sway bar connects the suspension of a wheel on one side of the vehicle with the suspension of a corresponding wheel on the other side of the vehicle. When the vehicle turns, the suspension of the wheel on the outer side of the turn is compressed. This causes torsion of the sway bar. This torsion then causes the suspension of the wheel on the inner side of the turn to also be compressed, or at least to expand less than if the sway bar was not provided. As a result, the frame and body of the vehicle roll less than if the sway bar was not provided.

Although the sway bar addresses the problems associated with the roll of the frame and vehicle body, it has some disadvantages. On such disadvantage is that the suspensions connected by the sway bar no longer act independently from each other. For example, when the right wheel of the vehicle hits a bump, the suspension of the right wheel compresses, but the sway bar also causes the suspension of the left wheel to compress even if the left wheel does not hit the bump. There are some operating conditions where independence of the suspensions may be more important than resistance to roll. For example, when a vehicle is operating at low speed over rough terrain, roll is not really an issue, but independence of the suspensions is desirable for rider comfort.

Therefore, there is a need for a suspension assembly and a vehicle having such a suspension assembly that allows selective use of the sway bar.

SUMMARY

It is an object of the present invention to ameliorate at least some of the inconveniences present in the prior art.

In one aspect, a vehicle has a frame, a left ground engaging member operatively connected to a first end portion of the frame and being disposed on a left side of a longitudinal centerline of the vehicle, a left suspension arm operatively connecting the left ground engaging member to the first end portion of the frame, a left shock absorber operatively connected between the left suspension arm and the frame, a right ground engaging member operatively connected to the first end portion of the frame and being disposed on a right side of the longitudinal centerline, a right suspension arm operatively connecting the right ground engaging member to the first end portion of the frame, a right shock absorber operatively connected between the right suspension arm and the frame, at least one other ground engaging member operatively connected to a second end portion of the frame opposite the first end portion of the frame, at least one other suspension arm operatively connecting the at least one other ground engaging member to the second end portion of the frame, at least one other shock absorber operatively connected between the at least one other suspension arm and the frame, a motor operatively connected to at least one of the left ground engaging member, the right ground engaging member and the at least one other ground engaging member, a sway bar pivotally connected to the frame, a left hinge pivotally connecting a left end of the sway bar to the left suspension arm, and a right hinge pivotally connecting a right end of the sway bar to the right suspension arm. The left hinge includes a first left hinge member pivotally connected to the left end of the sway bar, a second left hinge member pivotally connected to the left suspension arm, the second left hinge member being pivotally connected to the first left hinge member, and a left hinge lock selectively rigidly connecting the first left hinge member to the second left hinge member to prevent the first left hinge member from pivoting relative to the second left hinge member. The right hinge includes a first right hinge member pivotally connected to the right end of the sway bar, a second right hinge member pivotally connected to the right suspension arm, the second right hinge member being pivotally connected to the first right hinge member, and a right hinge lock selectively rigidly connecting the first right hinge member to the second right hinge member to prevent the first right hinge member from pivoting relative to the second right hinge member.

In a further aspect, when the left hinge lock rigidly connects the first left hinge member to the second left hinge member and the right hinge lock rigidly connects the first right hinge member to the second right hinge member, vertical movement the left and right ground engaging members relative to each other causes torsion of the sway bar. When the left hinge lock does not rigidly connect the first left hinge member to the second left hinge member and the right hinge lock does not rigidly connect the first right hinge member to the second right hinge member, vertical movement the left and right ground engaging members relative to each other results in substantially no torsion of the sway bar.

In an additional aspect, the left hinge lock includes at least one first aperture in the first left hinge member, at least one second aperture in the second left hinge member, and a left pin selectively inserted in the at least one first aperture and the at least one second aperture. The first and second left hinge members are generally fixed relative to each other when the left pin is inserted in the at least one first aperture and the at least one second aperture. The first and second left hinge members are pivotable relative to each other when the left pin is removed from the at least one first aperture and the at least one second aperture. The right hinge lock includes at least one first aperture in the first right hinge member, at least one second aperture in the second right hinge member, and a right pin selectively inserted in the at least one first aperture and the at least one second aperture. The first and second right hinge members are generally fixed relative to each other when the right pin is inserted in the at least one first aperture and the at least one second aperture. The first and second right hinge members are pivotable relative to each other when the right pin is removed from the at least one first aperture and the at least one second aperture.

In a further aspect, the left ground engaging member is a left wheel, the left suspension arm is a left swing arm pivotally connected to the frame about a laterally extending swing arm axis, the left wheel turns about a left wheel axis, the left hinge is disposed between the swing arm axis and the left wheel axis in a longitudinal direction of the vehicle, the right ground engaging member is a right wheel, the right suspension arm is a right swing arm pivotally connected to the frame about the swing arm axis, the right wheel turns about a right wheel axis, and the right hinge is disposed between the swing arm axis and the right wheel axis in the longitudinal direction of the vehicle.

In an additional aspect, the sway bar is pivotally connected to the frame about a sway bar axis. The sway bar axis is disposed between the swing arm axis and the left and right hinges in the longitudinal direction of the vehicle.

In a further aspect, the left shock absorber is pivotally connected to the left swing arm about a laterally extending left shock absorber axis. The left shock absorber axis is disposed between the left wheel axis and the left hinge in the longitudinal direction of the vehicle. The right shock absorber is pivotally connected to the right swing arm about a laterally extending right shock absorber axis. The right shock absorber axis is disposed between the right wheel axis and the right hinge in the longitudinal direction of the vehicle.

In an additional aspect, a pair of bushing blocks is connected to the frame. The sway bar is pivotally supported by the pair of bushing blocks.

In a further aspect, the left ground engaging member is a left wheel and the right ground engaging member is a right wheel. A left drive axle operatively connects the left wheel to the motor, and a right drive axle operatively connects the right wheel to the motor.

In an additional aspect, a differential operatively connects the left drive axle to the right drive axle. A driveshaft operatively connects the differential to the motor.

In a further aspect, the first end portion of the frame is a rear end portion of the frame and the second end portion of the frame is a front end portion of the frame.

In an additional aspect, the left ground engaging member is a left wheel and the right ground engaging member is a right wheel.

In a further aspect, the left wheel is a first left wheel, the left suspension arm is a first left suspension arm, the left shock absorber is a first left shock absorber, the right wheel is a first right wheel, the right suspension arm is a first right suspension arm, and the right shock absorber is a first left shock absorber. The at least one other ground engaging member includes a second left wheel operatively connected to the second end portion of the frame and being disposed on the left side of the longitudinal centerline of the vehicle, and a second right wheel operatively connected to the second end portion of the frame and being disposed on the right side of the longitudinal centerline of the vehicle. The at least one other suspension arm includes a second left suspension arm operatively connecting the second left wheel to the second end portion of the frame, and a second right suspension arm operatively connecting the second right wheel to the second end portion of the frame. The at least one other shock absorber includes a second left shock absorber operatively connected between the second left suspension arm and the frame, and a second right shock absorber operatively connected between the second right suspension arm and the frame.

In an additional aspect, the motor is operatively connected to the first left wheel, the first right wheel, the second left wheel and the second right wheel.

In a further aspect, the vehicle is an all-terrain vehicle having a seat mounted to the frame, and a steering handlebar. The steering handlebar is operatively connected to the first left wheel and the first right wheel or to the second left wheel and the second right wheel.

In another aspect, a suspension assembly for a vehicle has a left suspension arm, a left shock absorber operatively connected to the left suspension arm, a right suspension arm, a right shock absorber operatively connected to the right suspension arm, a sway bar operatively connected to the left and right suspension arms, a left hinge pivotally connecting a left end of the sway bar to the left suspension arm, and a right hinge pivotally connecting a right end of the sway bar to the right suspension arm. The left hinge includes a first left hinge member pivotally connected to the left end of the sway bar, a second left hinge member pivotally connected to the left suspension arm, the second left hinge member being pivotally connected to the first left hinge member, and a left hinge lock selectively rigidly connecting the first left hinge member to the second left hinge member to prevent the first left hinge member from pivoting relative to the second left hinge member. The right hinge includes a first right hinge member pivotally connected to the right end of the sway bar, a second right hinge member pivotally connected to the right suspension arm, the second right hinge member being pivotally connected to the first right hinge member, and a right hinge lock selectively rigidly connecting the first right hinge member to the second right hinge member to prevent the first right hinge member from pivoting relative to the second right hinge member.

In a further aspect, the left hinge lock includes at least one first aperture in the first left hinge member, at least one second aperture in the second left hinge member, and a left pin selectively inserted in the at least one first aperture and the at least one second aperture. The first and second left hinge members are generally fixed relative to each other when the left pin is inserted in the at least one first aperture and the at least one second aperture. The first and second left hinge members are pivotable relative to each other when the left pin is removed from the at least one first aperture and the at least one second aperture. The right hinge lock includes at least one first aperture in the first right hinge member, at least one second aperture in the second right hinge member, and a right pin selectively inserted in the at least one first aperture and the at least one second aperture. The first and second right hinge members are generally fixed relative to each other when the right pin is inserted in the at least one first aperture and the at least one second aperture. The first and second right hinge members are pivotable relative to each other when the right pin is removed from the at least one first aperture and the at least one second aperture.

In an additional aspect, the left suspension arm is a left swing arm adapted to be pivotally connected to a frame of the vehicle about a laterally extending swing arm axis at one end thereof and adapted to connect a left ground engaging member at another end thereof, the left hinge is disposed between the ends of the left swing arm, the right suspension arm is a right swing arm adapted to be pivotally connected to the frame about the swing arm axis at one end thereof and adapted to connect a right ground engaging member at another end thereof, and the right hinge is disposed between the ends of the right swing arm.

In a further aspect, the sway bar is adapted to be pivotally connected to the frame about a sway bar axis. The sway bar axis is disposed between the swing arm axis and the left and right hinges.

In an additional aspect, the left shock absorber is pivotally connected to the left swing arm about a laterally extending left shock absorber axis. The left hinge is disposed between the left shock absorber axis and the swing arm axis. The right shock absorber is pivotally connected to the right swing arm about a laterally extending right shock absorber axis. The right hinge is disposed between the right shock absorber axis and the swing arm axis.

In a further aspect, the sway bar is pivotally supported by a pair of bushing blocks.

For the purpose of this application, terms related to spatial directions such as 'front', 'rear', 'forward', 'rearward', 'left', 'right' are defined with respect to a forward direction of travel of the vehicle, and should be understood as they would be understood by a driver of the vehicle sitting in a normal riding position.

Embodiments of the present invention each have at least one of the above-mentioned object and/or aspects, but do not necessarily have all of them. It should be understood that some aspects of the present invention that have resulted from attempting to attain the above-mentioned object may not satisfy this object and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

The present suspension assembly is being described throughout this description as being used in a four wheel all-terrain vehicle (ATV). However, it is contemplated that the suspension assembly could be used in other wheeled vehicles having at least two spaced apart wheels, such as, for example, side-by-side off-road vehicles, sometimes referred to as the UTVs, and three-wheel vehicles. It is also contemplated that at least some aspects of the present invention could be used on a snowmobile. The present suspension assembly is also being described throughout this description as being connected to wheels. However, it is contemplated that the present suspension assembly could be connected to other types of ground engaging members such as, but not limited to, skis for example. The present suspension assembly is also being described throughout this description as being a rear suspension assembly connected to the two rear wheels of the vehicle at rear end portion thereof. However, it is contemplated that the present suspension assembly could be adapted to be a front suspension assembly connected to the two front wheels or two front skis of a vehicle at a front portion thereof.

Figure 1:
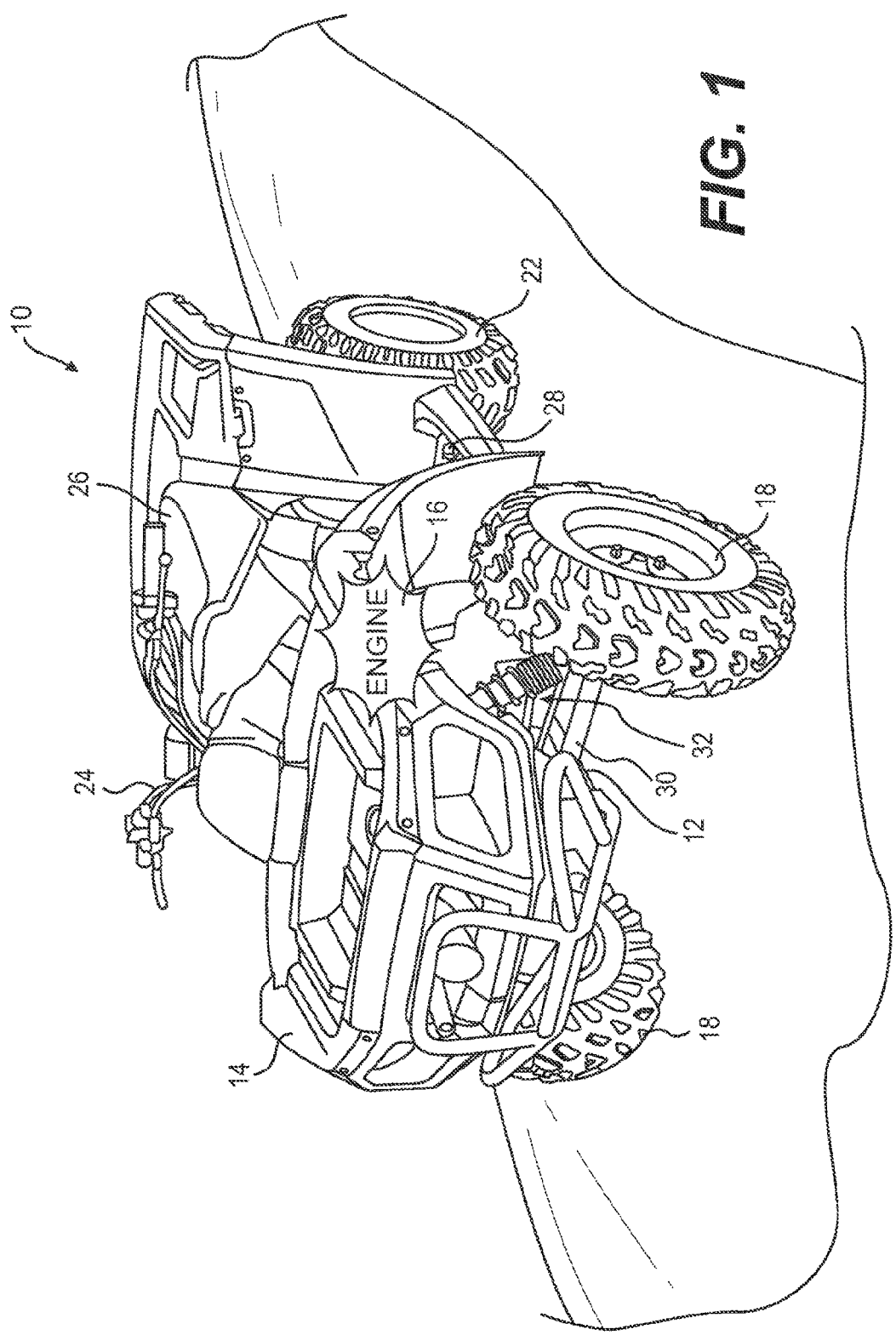
FIG. 1 is a perspective view, taken from a front, left side, of an all-terrain vehicle (ATV)

As shown in FIG. 1, an ATV 10 includes a frame 12 to which is mounted a body 14 and a motor in the form of a four-stroke internal combustion engine 16 (schematically shown in FIGS. 1 and 2) for powering the ATV 10. It is contemplated that the motor could be any other type of motor including, but not limited to, a two-stroke internal combustion engine, a diesel internal combustion engine and an electric motor. It is contemplated that the frame 12 could have configurations other than the one illustrated herein. U.S. Pat. No. 6,799,781, issued Oct. 5, 2004, the entirety of which is incorporated herein by reference, shows and describes various alternative embodiments that are contemplated.

Two front wheels 18 are operatively connected to a front end portion of the frame 12 on either side of a longitudinal centerline 20 (FIG. 2) of the ATV 10. Two rear wheels 22 are operatively connected to a rear end portion of the frame 12 on either side of the longitudinal centerline 20. All four wheels 18, 22 are provided with low-pressure balloon tires that are adapted for off-road conditions and traversing rugged terrain. A steering handlebar 24 is connected to a steering column (not shown) for actuating steering linkages connected to left and right front wheels 18 for steering the ATV 10. A straddle seat 26 is mounted to the frame 12 for supporting a driver and optionally one or more passengers. It is contemplated that the ATV 10 could be provided with a different type of seat. Footrests 28 (only one of which is shown) are provided below the seat 26 to receive the feet of the driver and, if applicable, the passenger.

Each front wheel 18 is pivotally connected to a front end portion of the frame 10 by a front suspension arm 30. In the present embodiment, the front suspension arms 30 are A-arms in connection with a MacPherson-type suspension, but other types of suspension arms, such as swing arms or double A-arms for example, are contemplated. Front shock absorbers 32 are connected at their lower ends to their corresponding suspension arm 30 and at their upper ends to the frame 12.

The front shock absorber 32 includes a coil spring disposed over a hydraulic damper. Since shock absorbers of this type are well known in the art, they will not be further described herein. It is contemplated that other types of front shock absorbers could be used. For example, the hydraulic dampers of the front shock absorbers 32 could be replaced by pneumatic dampers. The two rear wheels 22 are connected to the frame 12 by a rear suspension assembly that will be described in greater detail below.

Figure 2:
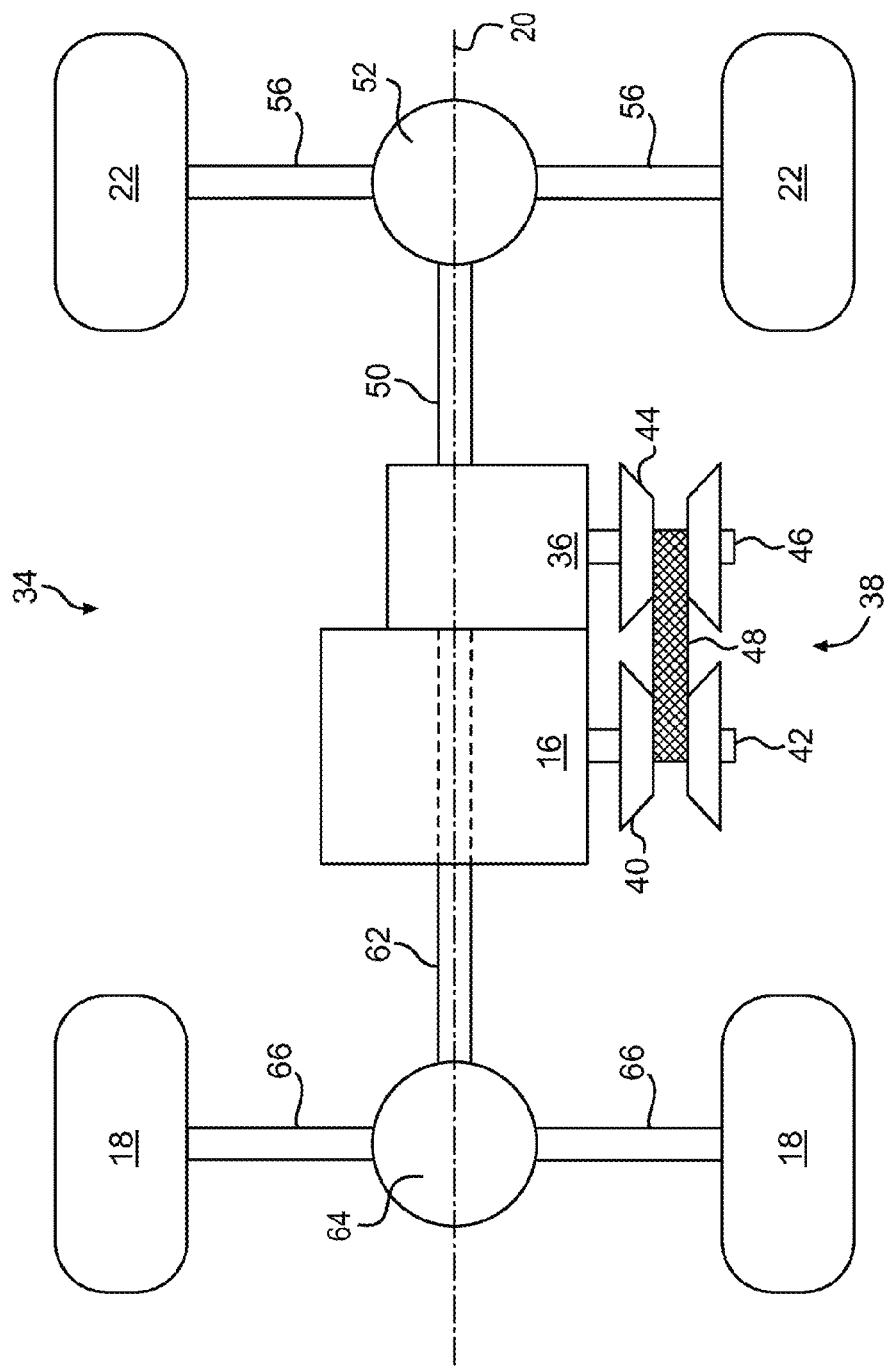
FIG. 2 is a schematic layout of a drive train of the ATV of FIG. 1.

Turning now to FIG. 2 the drive train 34 of the ATV 10 will be described. The engine 16 is connected to a transmission 36 by a continuously variable transmission (CVT) 38. The CVT 38 has a drive pulley 40 mounted on an output shaft 42 of the engine 16, a driven pulley 44 mounted on an input shaft 46 of the transmission 36, and a belt 48 looped around both pulleys 40, 44. The belt 48 transmits power from the drive pulley 40 to the driven pulley 44.

Figure 3:
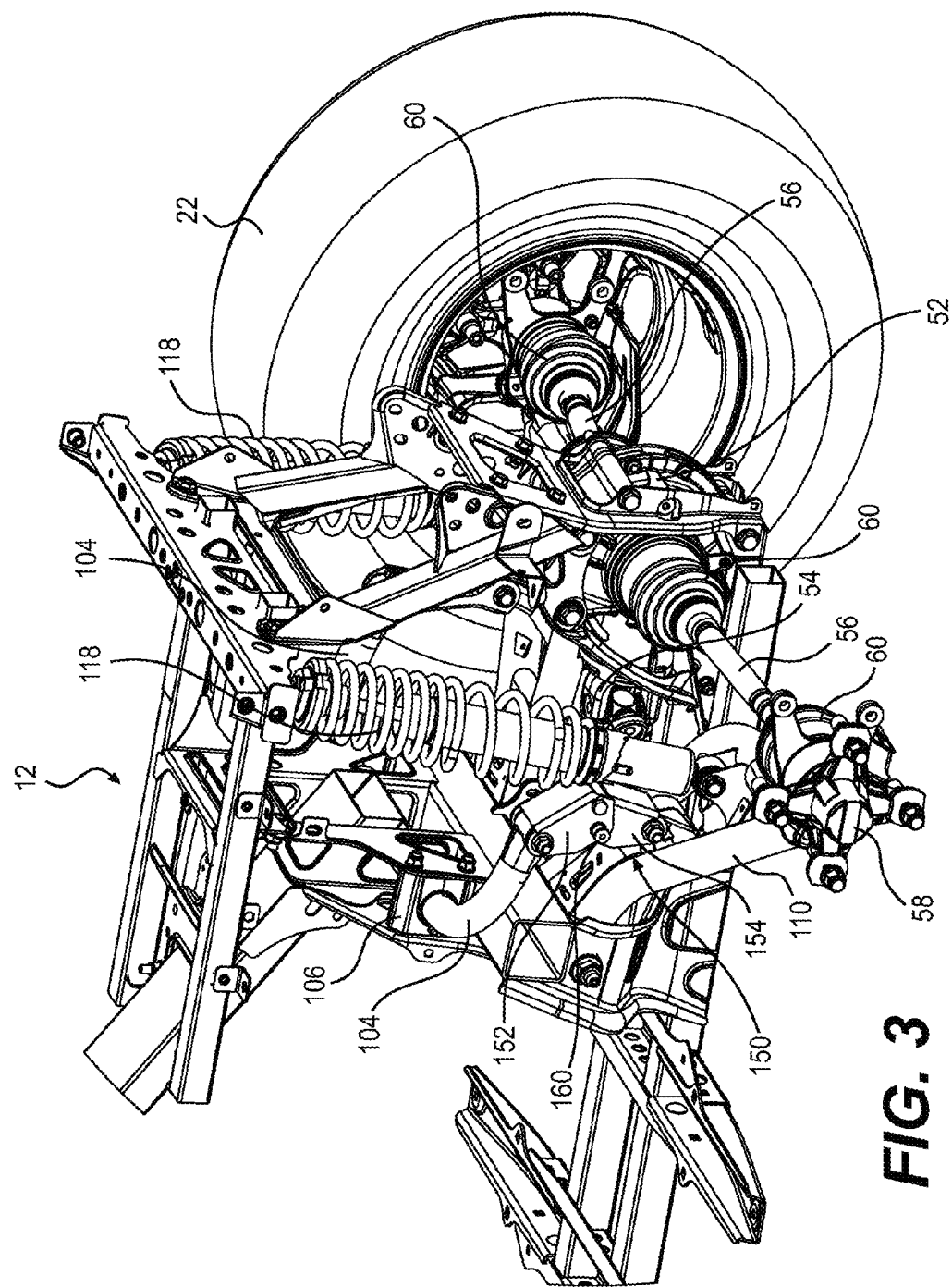
FIG. 3 is a perspective view taken from a rear, left side of a rear portion of a frame and rear suspension assembly of the ATV of FIG. 1, with a rear left wheel thereof removed for clarity.
Figure 4:
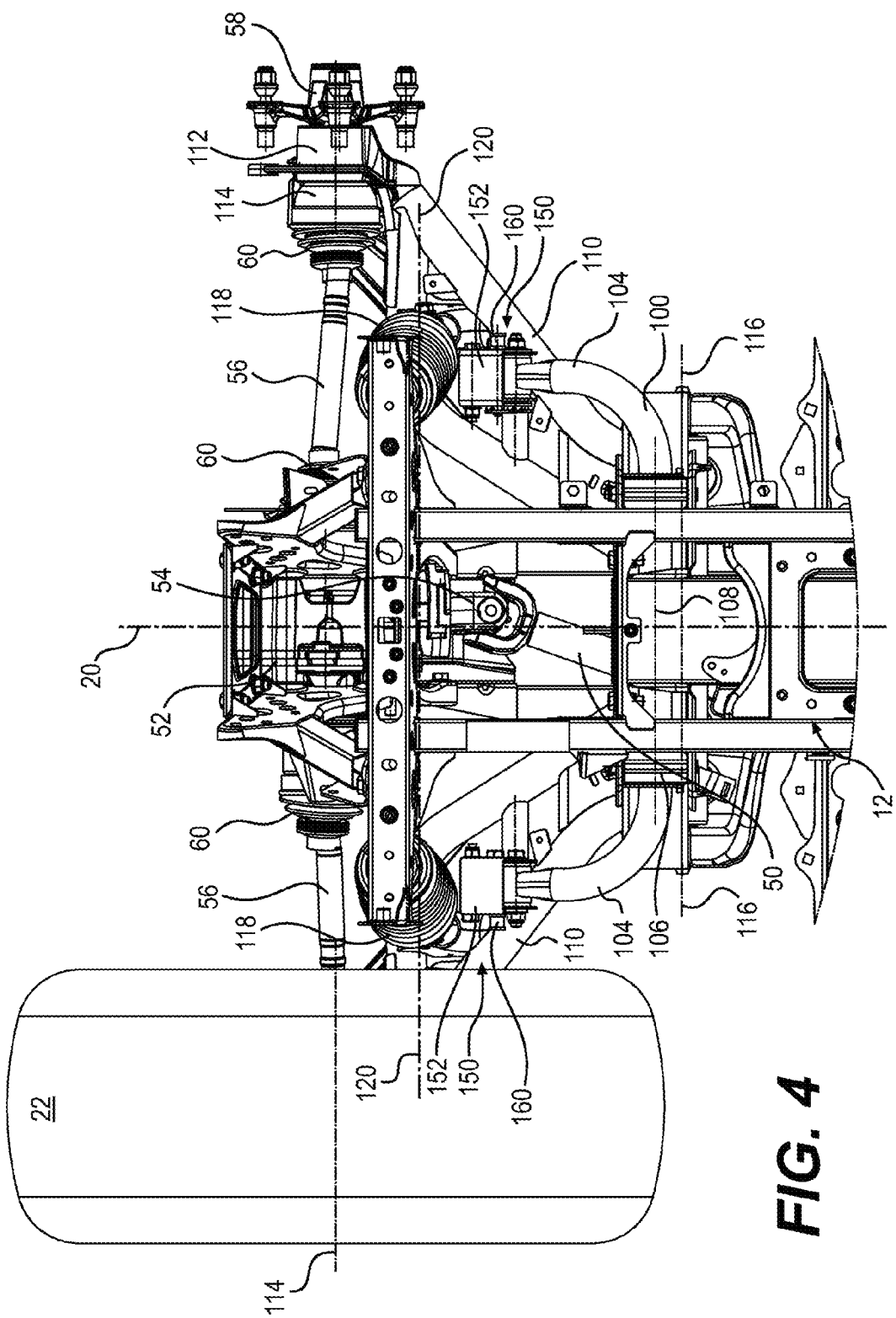
FIG. 4 is a top plan view of the rear portion of a frame and rear suspension assembly of the ATV of FIG. 1, with the rear left wheel thereof removed for clarity.

The transmission 36 is connected to and drives a rear driveshaft 50. The rear driveshaft 50 is connected to and drives a rear differential 52. Although the rear driveshaft 50 is shown as being centered about the longitudinal centerline 20 in the schematic representation of FIG. 2, as can be seen in FIG. 4, the rear driveshaft 50 is actually skewed relative to the longitudinal centerline 20. To permit this, the rear driveshaft 50 is connected to the transmission 36 by a universal joint 54 (FIG. 7) and to the rear differential 52 by another universal joint 54 (FIG. 4). The rear differential 52 is connected to and drives rear left and rear right drive axles 56 which are, in turn, connected to and drive rear wheel shafts (not shown). The rear wheel shafts are connected to rear wheel hubs 58 (a rear left one which is shown in FIGS. 3 and 4). The rear wheels 22 are mounted onto and fastened to the rear wheel hubs 58. To accommodate movement of the rear wheels 22 relative to the frame 12, constant velocity joints (not shown) are provided to connect the rear drive axles 56 to the rear differential 52 and their respective rear wheel shafts. These constant velocity joints are protected by boots 60 (best shown in FIG. 4).

The transmission 36 is connected to and drives the front wheels 18 via a front driveshaft 62, a front differential 64, front left and front right drive axles 66, front wheel shafts (not shown) and front wheel hubs (not shown) in a manner similar to above described manner in which the transmission 36 is connected to and drives the rear wheels 22.

Other embodiments of drive trains are also contemplated. For example, the CVT 38 could be omitted and the engine 16 would then be connected to a transmission 36 having multiple gear ratios. It is contemplated that one of the front and rear driveshafts 62, 50 could be selectively disconnected from the transmission 36 to operate the ATV 10 in a two-wheel drive mode. It is also contemplated that the front wheels 18 or the rear wheels 22 could not be driven by the engine 16 such that the ATV 10 can only operate in a two-wheel drive mode.

Turning now to FIGS. 3 to 10, the rear suspension assembly will be described in more detail. The rear suspension assembly includes a sway bar 100. The sway bar 100 has a generally straight central portion 102 (FIG. 5) and two rearwardly extending end portions 104. The central portion 102 is pivotally supported inside two bushing blocks 106. The bushing blocks 106 are connected to the rear end portion of the frame 12. As such, the sway bar 100 can pivot inside the bushing blocks 106 about a laterally extending sway bar axis 108 (FIG. 4).

Figure 7:
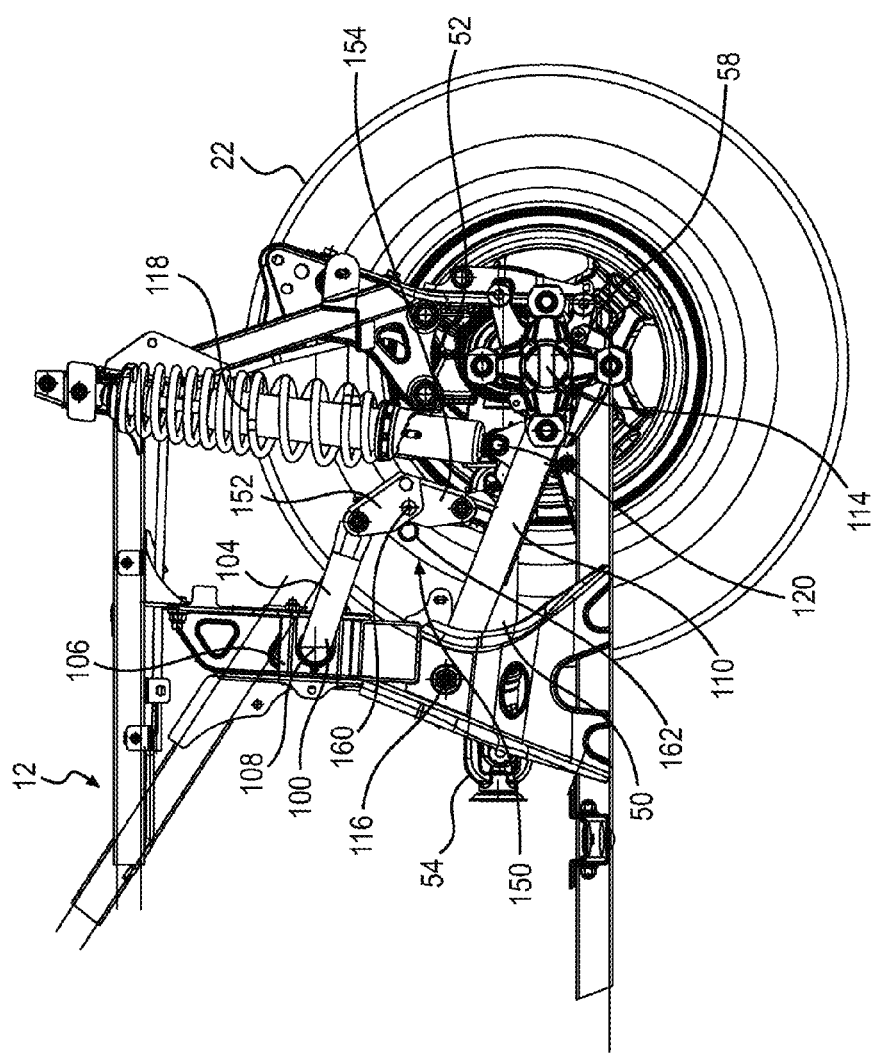
FIG. 7 is a left side elevation view of a rear portion of the frame and rear suspension assembly of the ATV of FIG. 1, with the rear left wheel thereof removed for clarity and the sway bar being operatively connected to the rear left suspension arm.

The rear left wheel 22 is connected to the frame 12 by a rear left suspension arm in the form of a left swing arm 110. It is contemplated that the rear left suspension arm could be of another type, such as, for example, an A-arm similar to the one used for the front suspension described above. The left swing arm 110 defines a sleeve 112 (FIG. 5) at a rear end thereof that receives the left rear wheel shaft (not shown) therein. One or more bearings (not shown) rotationally support the left rear wheel shaft inside the sleeve 112 thereby allowing the rear left wheel 22 to turn about a rear left wheel axis 114 (FIG. 4). The front end of the left swing arm 110 is pivotally connected to the frame 12 about a laterally extending rear left swing arm axis 116 (FIG. 4), thereby allowing the rear left wheel 22 to move up and down about the rear left swing arm axis 116. As can be seen in FIGS. 4 and 7, the sway bar axis 108 is disposed vertically above the rear left swing arm axis 116 and is disposed between the rear left swing arm axis 116 and the rear left wheel axis 114 in the longitudinal direction of the ATV 10.

A rear left shock absorber 118 is connected at its lower end to the left swing arm 110 about a laterally extending rear left shock absorber axis 120 (FIG. 4).

As can be seen in FIG. 4, the rear left shock absorber axis 120 is disposed between the sway bar axis 108 and the rear left wheel axis 114 in the longitudinal direction of the ATV 10. The rear left shock absorber 118 is connected at its upper end to the frame 12 about a generally longitudinally extending rear left shock absorber axis (not shown). The rear left shock absorber 118 includes a coil spring disposed over a hydraulic damper similar to those of the front shock absorber 32. It is contemplated that other types of front shock absorbers could be used. For example, the hydraulic damper of the rear shock absorber 118 could be replaced by a pneumatic damper. It is also contemplated that the front and rear shock absorbers 32, 118 could be of different types.

The rear right wheel 22 is operatively connected to the frame 12 in the same manner. For simplicity, the elements operatively connecting the rear right wheel 22 to the frame 12 will not be described in detail and have been labeled in the figures with the same reference numerals as those of the elements described above that are used to operatively connect the rear left wheel 22 to the frame 12.

A left hinge 150 pivotally connects the left end of the sway bar 100 to the left swing arm 110. Similarly, a right hinge 150 pivotally connects the right end of the sway bar 100 to the right swing arm 110. As can be seen in FIG. 4, the left and right hinges 150 are disposed between the sway bar axis 108 and the rear left shock absorber axis 120 of their corresponding shock absorber 118 in a longitudinal direction of the ATV 10.

The left hinge 150 will now be described in more detail. Since the right hinge 150 is a mirror image of the left hinge 150 it will not be described herein in detail.

Figure 5:
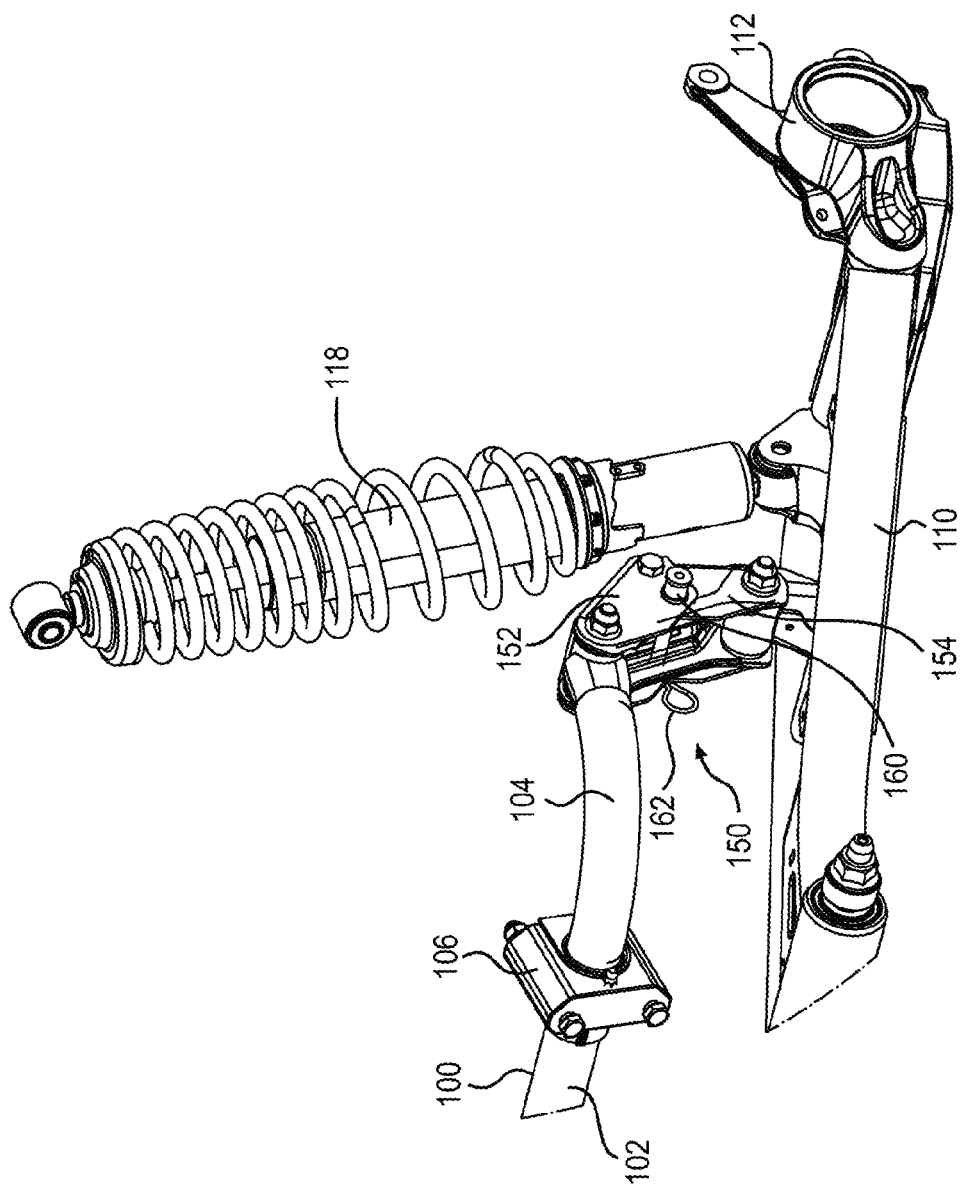
FIG. 5 is a perspective view taken from a front, left side of a left side of the rear suspension assembly of the ATV of FIG. 1, with a sway bar of the rear suspension assembly being operatively connected to a rear left suspension arm.
Figure 6:
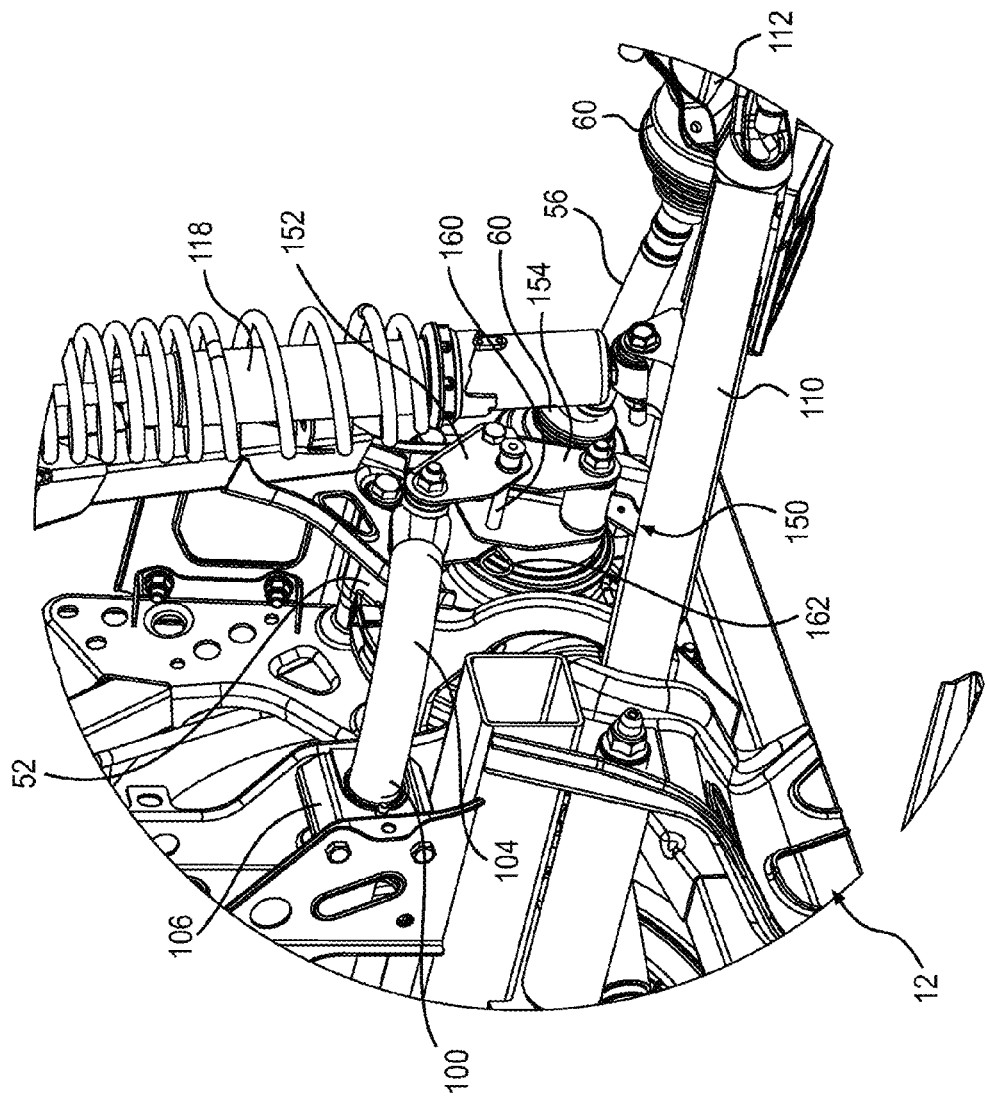
FIG. 6 is a perspective view taken from a front, left side of a left side of the rear suspension assembly and a rear portion of the frame of the ATV of FIG. 1, with the sway bar being operatively connected to the rear left suspension arm.

As best seen in FIG. 5, the left hinge 150 has a first hinge member 152 pivotally connected at one end thereof to the left end of the sway bar 100 and pivotally connected to one end of a second hinge member 154. The other end of the second hinge member 154 is pivotally connected to the left swing arm 110. The above three pivotal connections are provided at least in part by threaded fasteners (shown, but not labeled). The hinge members 152, 154 are generally C-shaped channels, with the second hinge member 154 being narrower than the first hinge member 152 so as to be received in the first hinge member 152. It is contemplated that the first hinge member 152 could be narrower than the second hinge member 154.

The left hinge 150 also has a hinge lock selectively rigidly connecting the hinge members 152, 154 to each other to prevent them from pivoting relative to each other. In the present embodiment, the hinge lock consists of apertures 156

(FIG. 8) in either side of the first hinge member 152, corresponding apertures 158 in either side of the second hinge member 154, a pin 160 and a retaining clip 162. By inserting the pin 160 in the apertures 156, 158 when the apertures 156, 158 are aligned with each other as shown in FIGS. 3 to 7, the hinge members 152, 154 become generally fixed relative to each other (i.e. there could be some play resulting from manufacturing tolerances for example) as they are prevented from pivoting relative to each other. The retaining clip 162 is inserted in an aperture in the end of the pin 160 to prevent the pin 160 from inadvertently coming out of the apertures 156, 158. By removing the pin 160 from the apertures 156, 158 as shown in FIGS. 8 to 10, the hinge members 152, 154 can pivot relative to each other.

Other embodiments of hinge locks are contemplated. For example, the hinge members 152, 154 could have a corresponding aperture 156, 158 in only one side thereof such that the pin 160 would not extend through the entire hinge members 152, 154. In another example, the hinge lock consists in a latch having one part of the first hinge member 152 and another part on the second hinge member 154. In yet another example, the hinge lock consists in a first pin fixedly connected to an outer side surface of the first hinge member 152, a second pin fixedly connected to a corresponding outer side surface of the second hinge member 154 and a rigid member having two apertures (one at each end thereof) having diameters corresponding to the diameters of the pins. To prevent pivoting of the hinge members 152, 154 relative to each other, the rigid member is attached to the hinge members 152, 154 by disposing one of the apertures of the rigid member around the first pin and the other of the apertures of the rigid member around the second pin. The rigid member can be kept in place by clips connected to the pins or by threaded nuts, should the ends of the pins be threaded. Removing the rigid member from the pins permits pivotal movement of the hinge members 152, 154 relative to each other.

When the first and second hinge members 152, 154 of both the left and right hinges 150 are rigidly connected to each other by having their respective pins 160 inserted therein, as shown in FIGS. 3 to 7, vertical movement of one of the rear wheels 22 relative to the other one of the rear wheels 22 causes torsion of the sway bar which then causes relative vertical movement of the other one of the rear wheels 22. For example, when the ATV 10 makes a left turn, the rear right shock absorber 118 gets compressed, resulting in upward vertical movement of the rear right wheel 22 and the right swing arm 110 relative to the rear left wheel 22 (with the frame 12 of the ATV 10 as a frame of reference). The upward movement of the right swing arm 110 pushes up the right hinge 150, which effectively acts as a rigid member, which in turn pushes up the right rearwardly extending end portion 104 of the sway bar 100. The upward movement of the right rearwardly extending end portion 104 of the sway bar 100 causes torsion of the central portion 102 of the sway bar 100. This torsion then causes the left rearwardly extending end portion 104 to move up. The upward movement of the left rearwardly extending end portion 104 pulls up the left hinge 150, which pulls up the left swing arm 110. The upward movement of the left swing arm 110 compresses the rear left shock absorber 118 and causes the rear left wheel 118 to move up relative to the frame 12, thereby reducing roll of the frame 12 and body 14 during the turn.

Figure 8:
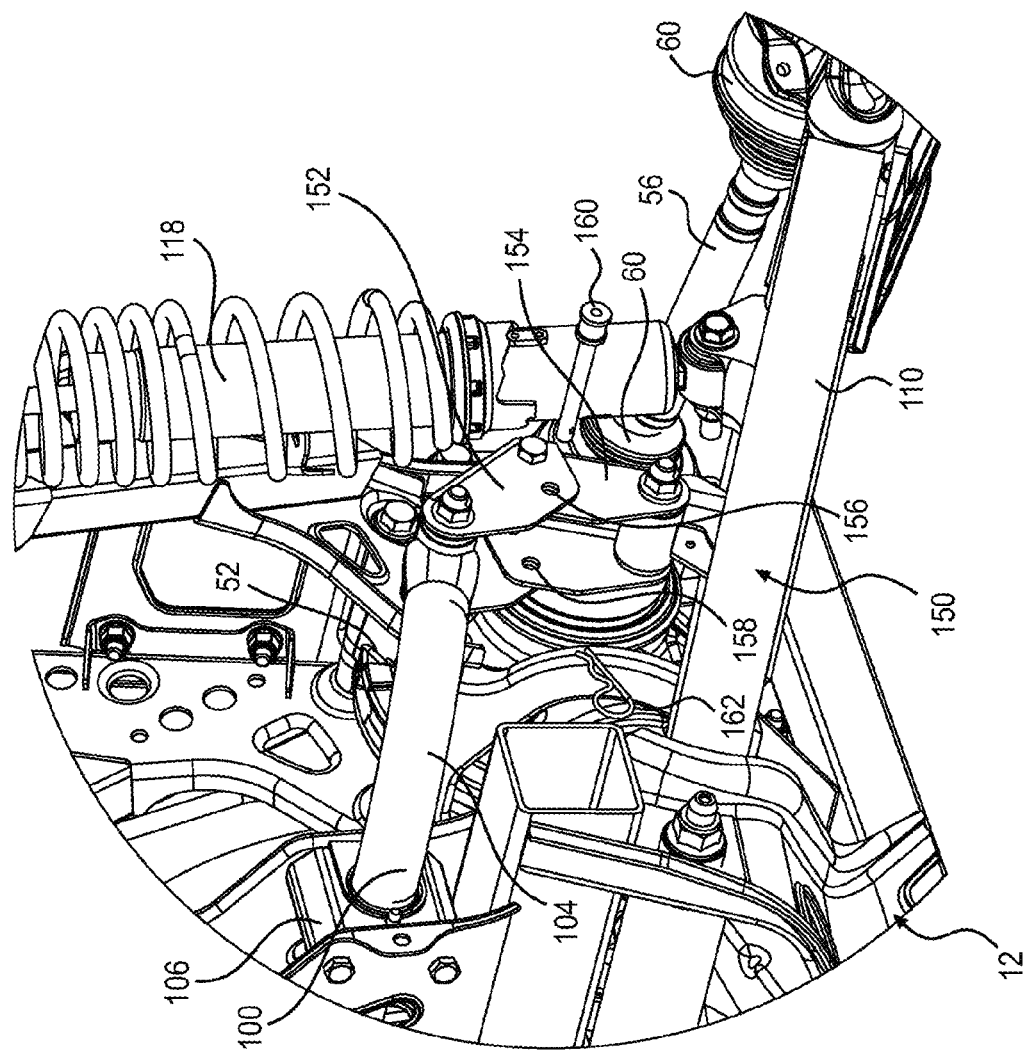
FIG. 8 is a perspective view taken from a front, left side of the left side of the rear suspension assembly and a rear portion of the frame of the ATV of FIG. 1, with the sway bar being operatively disconnected from the rear left suspension arm.
Figure 9:
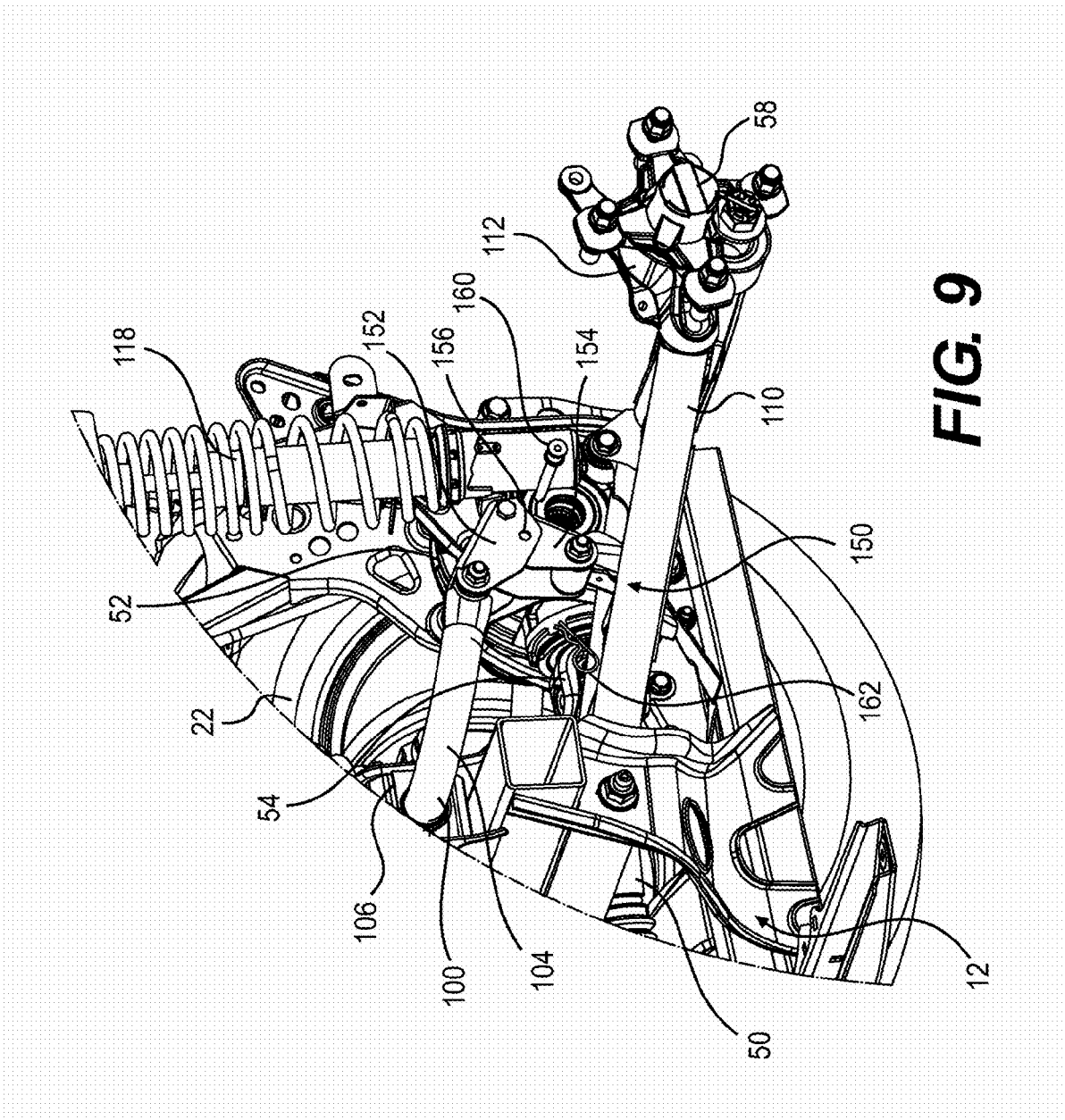
FIG. 9 is a perspective view taken from a front, left side of the left side of the rear suspension assembly and a rear portion of the frame of the ATV of FIG. 1, with the sway bar being operatively disconnected from the rear left suspension arm and a left shock absorber being compressed.
Figure 10:
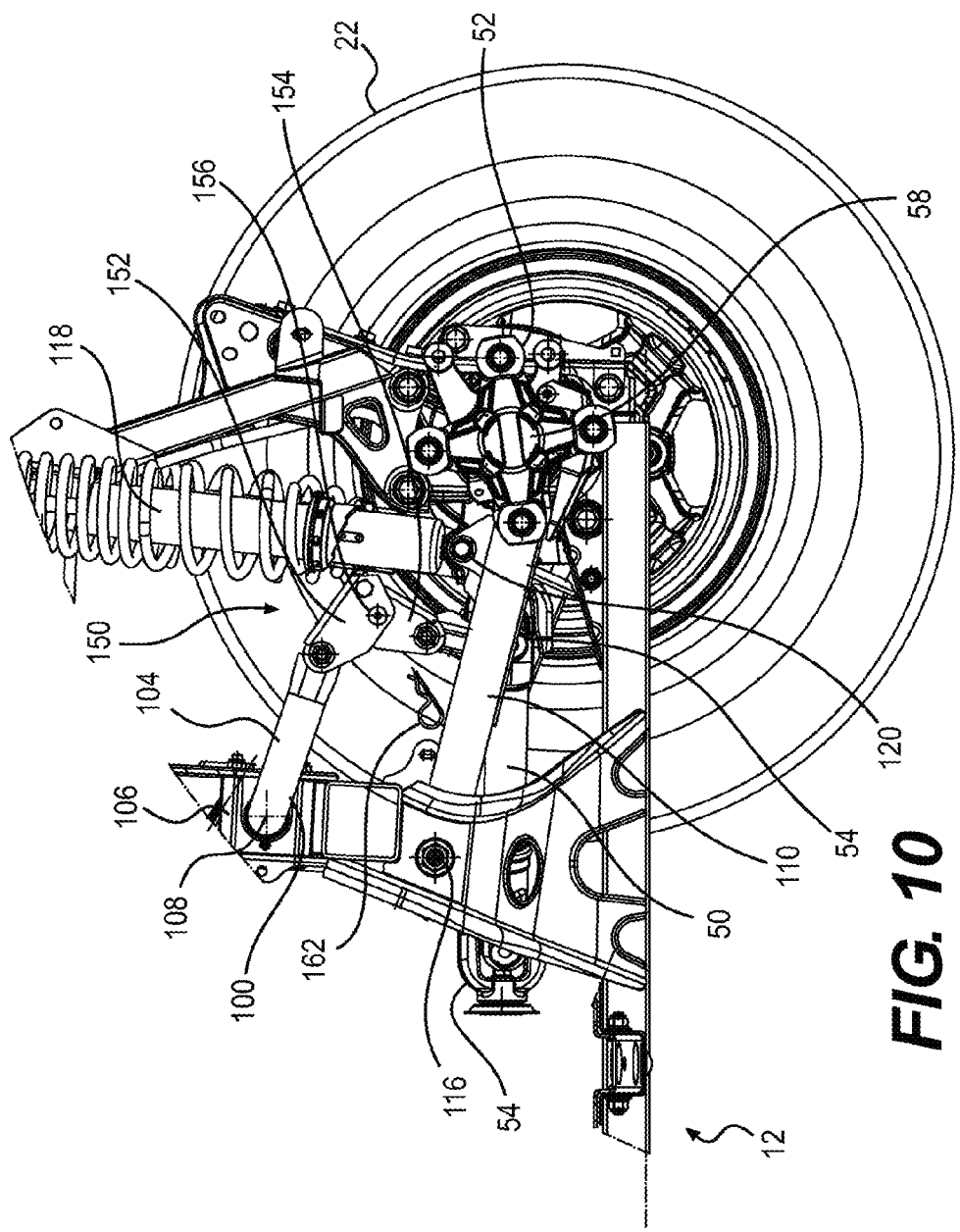
FIG. 10 is a left side elevation view of a rear portion of the frame and rear suspension assembly of the ATV of FIG. 1, with the rear left wheel thereof removed for clarity, the sway bar being operatively disconnected from the rear left suspension arm and the left shock absorber being compressed.

When the pins 160 are removed from the left and right hinges 150 as shown in FIGS. 8 to 10, the hinge members 152 can pivot relative to their corresponding hinge members 154. As a result, when one of the rear wheels 22 moves vertically relative to the frame 12, the corresponding swing arm 110 moves causing the corresponding shock absorber 118 to expand or compress as the case may be. As the corresponding swing arm 110 pivots, the hinge member 154 pivots relative to the hinge member 152, thereby permitting variations in distance between the corresponding end of the sway bar 100 and the corresponding swing arm 110. As a result, the end of the sway bar 100 does not move even if the swing arm 110 moves, and therefore there is no torsion of the sway bar 100 and the suspension elements on the opposite side of the frame 12 are unaffected by the vertical movement of the rear wheel 22. FIG. 8 shows the hinges 150 with the pins 160 removed and both wheels in the same position as in FIGS. 6 and 7 where the pins 160 are inserted in the hinges 150. As can be seen, the sway bar 100, the left hinge members 152, 154 and the left swing arm 110 are in the same position in FIGS. 6, 7 and 8. In FIGS. 9 and 10, the rear left wheel 22 has been moved vertically upwardly from the position shown in FIGS. 7 and 8, such as when going over a bump for example. As can be seen by comparing FIGS. 9 and 10 to FIGS. 6 and 7, the left hinge members 152, 154 have pivoted relative to each other and the left swing arm 110 has pivoted upwardly, but the sway bar 100 is in the same position for both positions of the rear left wheel 22. As such not torsion of the sway bar 100 occurs and the suspension elements of the rear suspension assembly on the right side of the longitudinal centerline 20 operate independently from the suspension elements of the rear suspension assembly on the left side of the longitudinal centerline 20. When the pins 160 are removed from the apertures 156, 158 of the left and right hinges 150, the rear suspension assembly effectively operates as if the sway bar 100 was not present. It is contemplated that for large vertical movement of one of the rear wheels 22 relative to the frame 12, the pivotal limit of the first hinge member 152 relative to the second hinge member 154 could be reached, thereby resulting in some torsion of the sway bar 100 and the transfer of movement to the other side of rear suspension assembly.

As such, the above rear suspension assembly allows the driver of the ATV 10 to select whether or not he desires the effects provided by the sway bar 100.

For example, should the driver anticipated that the ATV 10 will be driven at relatively high speed and/or will have to make relatively sharp turns, the driver can insert the pins 160 in the hinges 150 to obtain the roll reducing effects provided by the sway bar 100, but should the driver anticipate that the ATV 10 will be driven at relatively low speed over rough terrain, the driver can remove the pins 160 from the hinges 150 thereby effectively obtaining independent left and right rear suspensions.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:
1. A vehicle comprising:
a frame;
a left ground engaging member operatively connected to a first end portion of the frame and being disposed on a left side of a longitudinal centerline of the vehicle;
a left suspension arm operatively connecting the left ground engaging member to the first end portion of the frame;
a left shock absorber operatively connected between the left suspension arm and the frame;

a right ground engaging member operatively connected to the first end portion of the frame and being disposed on a right side of the longitudinal centerline;

a right suspension arm operatively connecting the right ground engaging member to the first end portion of the frame;

a right shock absorber operatively connected between the right suspension arm and the frame;

at least one other ground engaging member operatively connected to a second end portion of the frame opposite the first end portion of the frame;

at least one other suspension arm operatively connecting the at least one other ground engaging member to the second end portion of the frame;

at least one other shock absorber operatively connected between the at least one other suspension arm and the frame;

a motor operatively connected to at least one of the left ground engaging member, the right ground engaging member and the at least one other ground engaging member;

a sway bar pivotally connected to the frame;

a left hinge pivotally connecting a left end of the sway bar to the left suspension arm, the left hinge including:
  a first left hinge member pivotally connected to the left end of the sway bar;
  a second left hinge member pivotally connected to the left suspension arm, the second left hinge member being pivotally connected to the first left hinge member; and
  a left hinge lock selectively rigidly connecting the first left hinge member to the second left hinge member to prevent the first left hinge member from pivoting relative to the second left hinge member; and a right hinge pivotally connecting a right end of the sway bar to the right suspension arm, the right hinge including:
  a first right hinge member pivotally connected to the right end of the sway bar;
  a second right hinge member pivotally connected to the right suspension arm, the second right hinge member being pivotally connected to the first right hinge member; and
  a right hinge lock selectively rigidly connecting the first right hinge member to the second right hinge member to prevent the first right hinge member from pivoting relative to the second right hinge member.

2. The vehicle of claim 1, wherein when the left hinge lock rigidly connects the first left hinge member to the second left hinge member and the right hinge lock rigidly connects the first right hinge member to the second right hinge member, vertical movement of the left and right ground engaging members relative to each other causes torsion of the sway bar; and wherein when the left hinge lock does not rigidly connect the first left hinge member to the second left hinge member and the right hinge lock does not rigidly connect the first right hinge member to the second right hinge member, vertical movement of the left and right ground engaging members relative to each other results in substantially no torsion of the sway bar.

3. The vehicle of claim 1, wherein:

the left hinge lock includes:
  at least one first aperture in the first left hinge member;
  at least one second aperture in the second left hinge member; and
  a left pin selectively inserted in the at least one first aperture and the at least one second aperture, the first and second left hinge members being generally fixed relative to each other when the left pin is inserted in the at least one first aperture and the at least one second aperture, the first and second left hinge members being pivotable relative to each other when the left pin is removed from the at least one first aperture and the at least one second aperture; and the right hinge lock includes:
  at least one first aperture in the first right hinge member;
  at least one second aperture in the second right hinge member; and
  a right pin selectively inserted in the at least one first aperture and the at least one second aperture, the first and second right hinge members being generally fixed relative to each other when the right pin is inserted in the at least one first aperture and the at least one second aperture, the first and second right hinge members being pivotable relative to each other when the right pin is removed from the at least one first aperture and the at least one second aperture.

4. The vehicle of claim 1, wherein:

the left ground engaging member is a left wheel;

the left suspension arm is a left swing arm pivotally connected to the frame about a laterally extending swing arm axis;

the left wheel turns about a left wheel axis;

the left hinge is disposed between the swing arm axis and the left wheel axis in a longitudinal direction of the vehicle;

the right ground engaging member is a right wheel;

the right suspension arm is a right swing arm pivotally connected to the frame about the swing arm axis;

the right wheel turns about a right wheel axis; and the right hinge is disposed between the swing arm axis and the right wheel axis in the longitudinal direction of the vehicle.

5. The vehicle of claim 4, wherein:

the sway bar is pivotally connected to the frame about a sway bar axis; and the sway bar axis is disposed between the swing arm axis and the left and right hinges in the longitudinal direction of the vehicle.

6. The vehicle of claim 4, wherein:

the left shock absorber is pivotally connected to the left swing arm about a laterally extending left shock absorber axis, the left shock absorber axis being disposed between the left wheel axis and the left hinge in the longitudinal direction of the vehicle; and the right shock absorber is pivotally connected to the right swing arm about a laterally extending right shock absorber axis, the right shock absorber axis being disposed between the right wheel axis and the right hinge in the longitudinal direction of the vehicle.

7. The vehicle of claim 4, wherein:

the left wheel is a first left wheel;

the left suspension arm is a first left suspension arm;

the left shock absorber is a first left shock absorber;

the right wheel is a first right wheel;

the right suspension arm is a first right suspension arm;

the right shock absorber is a first right shock absorber;

the at least one other ground engaging member includes:
  a second left wheel operatively connected to the second end portion of the frame and being disposed on the left side of the longitudinal centerline of the vehicle; and a second right wheel operatively connected to the second end portion of the frame and being disposed on the right side of the longitudinal centerline of the vehicle;

the at least one other suspension arm includes:
a second left suspension arm operatively connecting the second left wheel to the second end portion of the frame; and
a second right suspension arm operatively connecting the second right wheel to the second end portion of the frame; and the at least one other shock absorber includes:
a second left shock absorber operatively connected between the second left suspension arm and the frame; and
a second right shock absorber operatively connected between the second right suspension arm and the frame.

8. The vehicle of claim 7, wherein the first end portion of the frame is a rear end portion of the frame and the second end portion of the frame is a front end portion of the frame.

9. The vehicle of claim 7, wherein the motor is operatively connected to the first left wheel, the first right wheel, the second left wheel and the second right wheel.

10. The vehicle of claim 7, wherein the vehicle is an all-terrain vehicle further comprising:
a seat mounted to the frame; and
a steering handlebar operatively connected to one of:
the first left wheel and the first right wheel; and
the second left wheel and the second right wheel.

11. The vehicle of claim 1, further comprising a pair of bushing blocks connected to the frame;
wherein the sway bar is pivotally supported by the pair of bushing blocks.

12. The vehicle of claim 1, wherein:
the left ground engaging member is a left wheel; and
the right ground engaging member is a right wheel; and
further comprising:
a left drive axle operatively connecting the left wheel to the motor; and
a right drive axle operatively connecting the right wheel to the motor.

13. The vehicle of claim 12, further comprising:
a differential operatively connecting the left drive axle to the right drive axle; and
a driveshaft operatively connecting the differential to the motor.

14. The vehicle of claim 1, wherein the first end portion of the frame is a rear end portion of the frame and the second end portion of the frame is a front end portion of the frame.

15. A suspension assembly for a vehicle comprising:
a left suspension arm;
a left shock absorber operatively connected to the left suspension arm;
a right suspension arm;
a right shock absorber operatively connected to the right suspension arm;
a sway bar operatively connected to the left and right suspension arms;
a left hinge pivotally connecting a left end of the sway bar to the left suspension arm, the left hinge including:
a first left hinge member pivotally connected to the left end of the sway bar;
a second left hinge member pivotally connected to the left suspension arm, the second left hinge member being pivotally connected to the first left hinge member; and
a left hinge lock selectively rigidly connecting the first left hinge member to the second left hinge member to prevent the first left hinge member from pivoting relative to the second left hinge member; and
a right hinge pivotally connecting a right end of the sway bar to the right suspension arm, the right hinge including:
a first right hinge member pivotally connected to the right end of the sway bar;
a second right hinge member pivotally connected to the right suspension arm, the second right hinge member being pivotally connected to the first right hinge member; and
a right hinge lock selectively rigidly connecting the first right hinge member to the second right hinge member to prevent the first right hinge member from pivoting relative to the second right hinge member.

16. The suspension assembly of claim 15, wherein:
the left hinge lock includes:
at least one first aperture in the first left hinge member;
at least one second aperture in the second left hinge member; and
a left pin selectively inserted in the at least one first aperture and the at least one second aperture, the first and second left hinge members being generally fixed relative to each other when the left pin is inserted in the at least one first aperture and the at least one second aperture, the first and second left hinge members being pivotable relative to each other when the left pin is removed from the at least one first aperture and the at least one second aperture; and
the right hinge lock includes:
at least one first aperture in the first right hinge member;
at least one second aperture in the second right hinge member; and
a right pin selectively inserted in the at least one first aperture and the at least one second aperture, the first and second right hinge members being generally fixed relative to each other when the right pin is inserted in the at least one first aperture and the at least one second aperture, the first and second right hinge members being pivotable relative to each other when the right pin is removed from the at least one first aperture and the at least one second aperture.

17. The suspension assembly of claim 15, wherein:
the left suspension arm is a left swing arm adapted to be pivotally connected to a frame of the vehicle about a laterally extending swing arm axis at one end thereof and adapted to connect a left ground engaging member at another end thereof;
the left hinge is disposed between the ends of the left swing arm;
the right suspension arm is a right swing arm adapted to be pivotally connected to the frame about the swing arm axis at one end thereof and adapted to connect a right ground engaging member at another end thereof; and
the right hinge is disposed between the ends of the right swing arm.

18. The suspension assembly of claim 17, wherein:
the sway bar is adapted to be pivotally connected to the frame about a sway bar axis; and
the sway bar axis is disposed between the swing arm axis and the left and right hinges.

19. The suspension assembly of claim 17, wherein:
the left shock absorber is pivotally connected to the left swing arm about a laterally extending left shock absorber axis, the left hinge being disposed between the left shock absorber axis and the swing arm axis; and the right shock absorber is pivotally connected to the right swing arm about a laterally extending right shock absorber axis, the right hinge being disposed between the right shock absorber axis and the swing arm axis.

20. The suspension assembly of claim 15, further comprising a pair of bushing blocks;

wherein the sway bar is pivotally supported by the pair of bushing blocks.

\* \* \* \* \*